(12) United States Patent
Celella (10) Patent No.: US 9,758,319 B2
(45) Date of Patent: Sep. 12, 2017

(54) VACUUM OPERATED WOOD PELLET HANDLING, FILTERING AND DISPENSING APPARATUS, SYSTEM AND METHODS OF USE THEREOF

(71) Applicant: Carl D. Celella, Feura Bush, NY (US)

(72) Inventor: Carl D. Celella, Feura Bush, NY (US)

( * ) Notice: Subject to any disclaimer, the term of this patent is extended or adjusted under 35 U.S.C. 154(b) by 80 days.

(21) Appl. No.: 14/724,917

(22) Filed: May 29, 2015

(65) Prior Publication Data
US 2015/0344242 A1    Dec. 3, 2015

Related U.S. Application Data

(60) Provisional application No. 62/004,397, filed on May 29, 2014.

(51) Int. Cl.
*B65G 53/26* (2006.01)
*B65G 65/32* (2006.01)
*B65G 65/40* (2006.01)
*B65G 53/36* (2006.01)
*B65G 53/60* (2006.01)
*F23K 1/00* (2006.01)
*F23K 3/02* (2006.01)

(52) U.S. Cl.
CPC .......... *B65G 53/26* (2013.01); *B65G 53/36* (2013.01); *B65G 53/60* (2013.01); *B65G 65/32* (2013.01); *B65G 65/40* (2013.01); *F23K 1/00* (2013.01); *F23K 3/02* (2013.01)

(58) Field of Classification Search
CPC .... B65G 53/26; B65G 53/60; B65G 53/4683; F27D 3/18

USPC ................ 406/151, 152, 153, 22, 122, 171; 414/171

See application file for complete search history.

(56) References Cited

U.S. PATENT DOCUMENTS

| | | | | |
|---|---|---|---|---|
| 1,808,807 | A * | 6/1931 | De Graw | C10J 3/30 294/68.24 |
| 1,824,853 | A * | 9/1931 | Wells | C10J 3/30 414/164 |
| 3,137,399 | A * | 6/1964 | Renkes | C21B 7/18 266/159 |
| 3,544,167 | A * | 12/1970 | Akiyama | A24C 5/391 131/110 |
| 3,598,257 | A * | 8/1971 | Pantke | F27B 1/20 266/176 |
| 4,394,259 | A * | 7/1983 | Benny | A01K 79/00 209/143 |
| 4,412,770 | A * | 11/1983 | Galow | C10B 31/04 202/262 |
| 4,439,276 | A * | 3/1984 | Galow | C10B 31/04 202/239 |
| 4,973,203 | A * | 11/1990 | Oftedal | B65G 53/42 406/113 |

(Continued)

*Primary Examiner* — Joseph Dillon, Jr.
(74) *Attorney, Agent, or Firm* — Schmeiser, Olsen & Watts, LLP (57) ABSTRACT

A vacuum operated wood pellet management apparatus, systems and methods thereof, capable of handling, transferring, dispensing and filtering wood pellets. The pellet management apparatus and systems comprising a housing having a motor and a vacuum fan, a power supply, wherein the power supply controls an output of the motor, a pellet chamber connected to the housing, wherein the pellet chamber includes an inlet port configured to receive a plurality of wood pellets from a source of wood pellets and an outlet port regulated by a self-closing hinge.

16 Claims, 9 Drawing Sheets

(56) References Cited

U.S. PATENT DOCUMENTS

| | | | | |
|---|---|---|---|---|
| 5,033,914 A * | 7/1991 | Wuertele | B65G 53/28 | 222/61 |
| 5,147,152 A * | 9/1992 | Link | B29C 47/10 | 406/1 |
| 5,163,786 A * | 11/1992 | Christianson | B65G 53/60 | 406/109 |
| 5,341,856 A * | 8/1994 | Appenzeller | B65G 53/28 | 141/231 |
| 6,379,086 B1 * | 4/2002 | Goth | B29C 47/10 | 406/130 |
| 6,588,988 B2 * | 7/2003 | Zlotos | B65G 53/24 | 406/14 |
| 7,066,689 B2 * | 6/2006 | Maguire | B65G 53/24 | 406/163 |
| 7,228,990 B2 * | 6/2007 | Schmidt | B28C 5/40 | 141/83 |
| 7,309,201 B2 * | 12/2007 | McNaughton | B01J 8/003 | 414/160 |
| 7,972,087 B2 * | 7/2011 | Davison | A22C 21/0053 | 222/410 |
| 8,061,524 B2 * | 11/2011 | Camoriano | B01J 8/002 | 209/236 |
| 8,113,745 B2 * | 2/2012 | Aoki | B65G 53/525 | 406/126 |
| 2002/0172566 A1 * | 11/2002 | Issler | B65G 53/28 | 406/153 |
| 2007/0131113 A1 | 6/2007 | Gadbury et al. | | |
| 2012/0177451 A1 * | 7/2012 | Kvalheim | B65G 65/36 | 406/151 |
| 2013/0209180 A1 * | 8/2013 | Moretto | B65G 53/66 | 406/153 |
| 2014/0205386 A1 * | 7/2014 | Maguire | B65G 53/24 | 406/151 |
| 2014/0255110 A1 * | 9/2014 | Albin | C10G 11/18 | 406/145 |
| 2016/0096693 A1 * | 4/2016 | Hanaoka | B65G 53/26 | 406/19 |
| 2016/0280473 A1 * | 9/2016 | Veselov | B65G 53/24 | |

* cited by examiner

VACUUM OPERATED WOOD PELLET HANDLING, FILTERING AND DISPENSING APPARATUS, SYSTEM AND METHODS OF USE THEREOF

CROSS REFERENCE TO RELATED APPLICATIONS

This application claims priority and benefit of U.S. Patent Application No. 62/004,397 entitled VACUUM OPERATED WOOD PELLET HANDLING, FILTERING AND DISPENSING SYSTEM AND METHODS OF USE THEREOF, filed on May 29, 2014, the content of which is incorporated herein by reference.

FIELD OF TECHNOLOGY

The present disclosure relates generally to the handling, filtering and dispensing of fuel related materials. More specifically, the disclosure relates to an apparatus, system and method for the management of wood pellet fuel including the handling, transporting, filtering, storing and dispensing of wood pellet fuel to residential homes and/or commercial businesses.

BACKGROUND

Pellet fuels used for heating systems such as pellet stoves and central heating furnaces have become increasingly popular over the last decade as the price of other conventional heating fuels such as oil and natural gas become prohibitively expensive. The surge in fossil fuel prices has resulted in an increasing demand for cheaper and efficient alternatives. This trend has resulted in the doubling in production of wood fuel pellets between 2006 and 2010. Experts suggest that the trend may continue, resulting in another doubling of wood pellet production in the upcoming years.

Currently, known methods for handling, dispensing and transporting wood pellets used in fuel systems such as pellet burning stoves, are performed by manually lifting and transporting large, heavy bags or containers of pellets and storing them in a dry place until they are needed. It may be difficult for the average fuel pellet user to manage, move and dispense these bags as they may be too heavy, or slip out of the user's arms. The difficulties associated with handling these bags or containers of pellets may be multiplied when the user is faced with climbing up and down stairs or uneven surfaces. Furthermore, the bulky bags or containers must be regularly lifted and carried to the pellet stove for dispensing. In some instances, the pellets must be manually carried and dispensed on a daily basis, or even multiple times per day. This lifting and dispensing process may be difficult and arduous for even the average wood pellet user, let alone users who may be smaller individuals, elderly or handicapped.

Wood pellets being dispensed into the feed hopper of known pellet stoves lack any type of filtering system that may separate fine particulate matter such as sawdust from the wood pellets. This lack of a filtering system may result in airborne sawdust and other particulates being dispersed into the air. The dispersal of sawdust or other particulates may reduce and affect the quality of the air inside the home or place of business. The lack of filtering may further present additional problems because the majority of the sawdust may remain mixed with the wood pellets and is dispensed into the feed hopper of the pellet stove. The sawdust and other fine particulate matter, when burned inside the stove, may quickly turn to ash in the stove and reduce the stoves efficiency as well as increase the need or frequency for maintenance and cleaning thereof.

Previously published apparatuses such as the one described in US Patent Publication 2007/031113 A1 include flawed mechanisms that will not effectively or efficiently transfer wood pellets from one container or source to another. The apparatus described in the 113' publication relies on paddle wheel mechanism rotating via a motor to feed and transfer the pellets through the apparatus and into the output of the system. As it is well known, paddlewheels are used for liquids and other fluid matter, not solid materials. The apparatus described in the '113 publication will not work effectively and will be prone to the solid pellets jamming and lodging themselves within the paddlewheel structure, preventing the transfer of pellets to the designated container. The apparatus of the '113 publication relies on the paddlewheel to transfer the pellets while simultaneously utilizing the paddle to maintain an air tight seal of the vacuum. However, as the paddlewheel mechanism becomes stuck or jammed, it will no longer be able to provide the necessary motion to continuously feed the pellets through the system described in the '113 publication, nor will the vacuum pressure be properly maintained which results as the seal formed by the paddle will be disengaged, thus preventing the introduction of any additional pellets into the apparatus. Moreover, if the paddlewheel becomes jammed or unable to continuously operate properly, the motor may continue to run and ultimately burn out or become a dangerous hazard.

Thus, a need exists for a wood pellet handling, filtering, transferring and dispensing apparatus and methods for automatically filtering, handling and transporting wood pellet fuel from a source of pellets or a storage area to the pellet stove that is practical, reliable, efficient, and will provide pellets to a designated location without undesired interruptions to the feed of the wood pellets that could result in dangerous operating conditions.

SUMMARY

A first aspect of the present disclosure provides a pellet management apparatus comprising a housing having a motor and a vacuum fan, a power supply, wherein the power supply controls an output of the motor and a pellet chamber connected to the housing, wherein the pellet chamber includes an input port configured to receive a plurality of wood pellets from a source of wood pellets and an outlet port regulated by a self-closing hinge.

A second aspect of the present disclosure provides a pellet management system comprising a first container having inlet and an outlet, a pellet management apparatus including a housing having a motor and a vacuum fan, a power supply that controls an output of the motor, a pellet chamber connected to the housing, wherein the pellet chamber has an inlet, and an outlet regulated by a self-closing hinge, a conduit connected to the outlet of the first container and the inlet of the pellet management apparatus and a second container having an inlet, wherein said inlet of the second container is configured to receive a plurality of wood pellets from the outlet of the pellet management apparatus.

A third aspect of the present disclosure provides a method for managing a plurality of wood pellets comprising the steps of providing a pellet management apparatus comprising a housing having a motor, a vacuum fan, a power supply that controls an output of the motor, a pellet chamber connected to the housing, wherein the pellet chamber has an inlet, and an outlet regulated by a self-closing hinge, initiating the vacuum fan via the motor, displacing a plurality of wood pellets from a source of wood pellets into a conduit attached to the inlet of the pellet chamber, amassing within the pellet chamber, a requisite amount of wood pellets to disengage the self-closing hinge, disengaging the self-closing hinge, dispensing the requisite amount of wood pellets from the pellet chamber and re-engaging the self-closing hinge.

BRIEF DESCRIPTION OF THE DRAWINGS

Some of the embodiments of this disclosure will be described in detail, with reference to the following figures, wherein like designations denote like members, wherein.

DETAILED DESCRIPTION

Although certain embodiments of the present invention will be shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., which are disclosed simply as an example of an embodiment. The features and advantages of the present invention are illustrated in detail in the accompanying drawings, wherein like reference numerals refer to like elements throughout the drawings.

As a preface to the detailed description, it should be noted that, as used in this specification and the appended claims, the singular forms "a", "an" and "the" include plural referents, unless the context clearly dictates otherwise.

Figure 1:
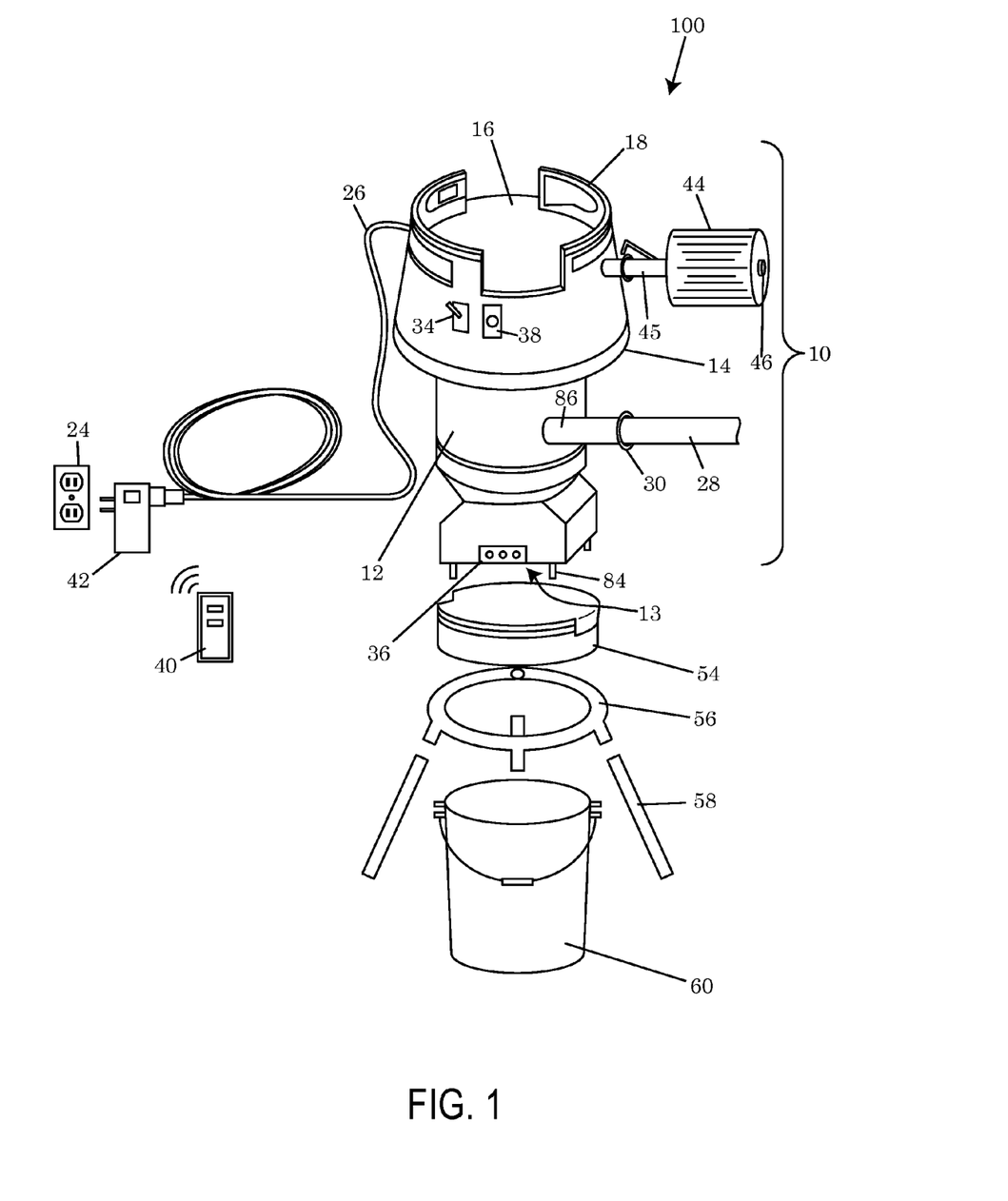
FIG. 1 depicts a perspective view of one embodiment of a pellet management apparatus.

Referring to drawings, FIG. 1 depicts an embodiment of a vacuum operated pellet management apparatus 10. The pellet management apparatus 10 may be used for handling, loading, dispensing, filtering and transferring wood pellets between one or more sources or containers to a desired location, container, storage facility or wood pellet burning apparatus such as a wood stove or furnace. In some embodiments of the wood pellet apparatus 10, the pellet apparatus 10 may include a protective housing 14. The housing 14 may act as a material defining a storage compartment or covering, for a central region of the pellet apparatus 10 to provide an internal space which may include one or more additional components that may be responsible for creating a vacuum which may draw the wood pellets into pellet apparatus 10. In some embodiments, these additional components being contained within the housing 14 may include a vacuum head 16 having a vacuum fan 20 and a motor 22.

In alternative embodiments, the housing 14 may be equipped with one or more additional features to assist the user. These additional features may include one or more lights, sounds, signals or reminders to inform or alert the user regarding the operation of the apparatus. In other embodiments, the housing may be equipped with handles 18, handholds, or grips to further assist the user in the transportations and positioning of the apparatus 10. In one embodiment, the one or more additional features may include an LED lighting system to convey information regarding the status of the apparatus 10 or the mode of operation the apparatus 10 to the user. An embodiment of the apparatus 10 equipped with a lighting system may identify various status changes including but not limited to identifying when the apparatus: is on/off, in need of additional pellets, has sufficient pellets, is operating in a dispensation mode or the apparatus is operating in a fill mode.

The housing 14 of the pellet management apparatus made include one or more motors 22. The motor 22 may be one of the components that operates to initiate and maintain the vacuum which may draw pellets into the apparatus 10. The motor 22, may be connected to and work in conjunction with the vacuum fan 20, to rotate the vacuum fan 20 and create the differences in pressure which causes the formation of a vacuum. Embodiments of the motor may include an electric motor and the motor may be an AC or DC powered motor. Embodiment of motor 20 types which may be used may include any synchronous, 1-phase induction motor, 3-phase induction motor, separately excited or self-excited electric motors, brush motor or brushless motor.

Embodiments of the motor 22 may be excited by electrical current supplied by a power source 24. This electrical current electrically exciting the motor 22 may simultaneously cause the fan blades of the vacuum fan 20 to turn as the motor operates, forcing air forward toward an exhaust port 45. In response to the rotation of the fan blades of the vacuum fan 20, the air particles may also be driven forward toward the exhaust port 45. This may in turn may cause the density of the air particles to increase in the front of the fan (increasing the pressure) while the air pressure decreases behind the fan. Accordingly, the pressure drop behind the vacuum fan 20 may create a partial vacuum or suction inside the pellet apparatus 10. Embodiments of the apparatus may create a large enough vacuum to draw in both ambient air external to the pellet apparatus as well as a plurality of pellets through a conduit 28 having an inlet 86 entering the pellet apparatus 10.

Embodiments of the motor 22 may be regulated by a wired or wireless power source 24, including both conventional power sources and alternative power sources. For example, the power source operating the motor 22 may be an electrical wire connected to a power outlet, a generator, rechargeable or non-rechargeable battery, such as a lithium ion or nickel cadmium battery, a solar panel, wind turbine, Wi-Fi based power charging, or any other means known to produce an electrical current capable of energizing the motor 22. In the Exemplary embodiment depicted in FIG. 1, the motor 22 may be operated by an electrical cord 26 extending from motor 22 within the housing 14 to an electrical outlet 24 acting as the power source.

Embodiments of the pellet apparatus 10 may regulate the flow of electrical energy from the power source 24 to the motor 22 in a numerous combination of ways. For example, in some embodiments, the flow of electricity from the power supply 24 to the motor 22 may be regulated by a manually operated on/off switch 34. In an alternative embodiment, the pellet apparatus 10 may also include a digital or analog timer 38. The timer 38 may allow a user to set a desired interval for supplying electricity from the power supply 24 to the motor 22 and in turn activate the motor 22 and vacuum fan 20. For example, a user may adjust the timer 38 to activate at a specific time of day, a specific day of the week or month, or an interval of time between 1 to 24 hours, 1 to 36 hours, 1 to 48 hours, 1 to 60 hours, 1-72 hours, or any interval of time including down to the minute or second desired. Moreover, the user may also adjust how long the timer 38 activates the motor 22. For example, the user may require the motor 22 to activate for ≤1 min, ≤5 min, ≤10 min, ≤20 min, ≤30 min or ≤30 min for a given period of activation to accomplish the transfer and dispensation of pellets. The timer 38 may assist the user by automatically engaging the apparatus and maintaining the electrical excitation of the apparatus for the time needed to manage the pellets and then deactivate the motor 22 until the next interval of activation occurs.

The length of the activation period needed to perform a task may dependent upon certain factors of the apparatus 10, including the motor size and rating, the vacuum fan size and fan speed, the amount of pellets needed to be transferred or suctioned into the pellet apparatus 10, the size of the apparatus 10 including the size of the pellet chamber 12, the size of a storage container being filled or the fuel supply needs of the pellet stove or furnace the pellet apparatus is transferring the wood pellets to. The timer 38 may be able to adjust the length of the motor activation period in accordance with the user's requirements. For example, in some embodiments the timer 38 may be adjusted to activate the motor for between ≤1-10 minutes, ≤1-20 minutes, ≤1-30 minutes, ≤30-45 minutes, ≤30-60 minutes, ≤1 hour-3 hours, ≤3 hours-6 hours, ≤6 hours-12 hours, ≤12 hours-24 hours or more.

In some embodiments, the timer 38 may include a transmitter and/or a receiver which may allow the timer to be networked to a computing device and accessed remotely. In some embodiments, a user may remotely set the timer interval or the length of the activation period. In alternative embodiments, the timer may be set by a remote control 40. A computing device may be any programmable electronic device capable of accepting data and performing mathematical and logical operations. Embodiments of a computing device may include devices having a processor, and on-board memory. Examples of a computing device may include but is not limited to a personal computer, laptop, tablet, notebook computer, cell phone, smartphone, smart television or remote control. The network between the timer and computing device or remote 40 may be accessible via wired and wireless means, including but not limited to Wi-Fi, Ethernet cable, telephone cable, RFID, Bluetooth, radio waves, infrared and coaxial cable.

In alternative embodiments, the pellet apparatus 10 may be equipped with a remotely accessible switch 42. Embodiments of the remotely accessed switch may be connected at any point along the circuit between the power source 24 and the motor 22. In the exemplary embodiment depicted in FIG. 1, the remote switch 42 may take the form of a receiver that may plug directly into the power source 24. The remote switch 42 may be capable of receiving a signal from a remote control 40 or a computing device. The remote switch 42 may open or close based on the signals received by the remote control 40 or the computing device. In some embodiments, the remote control 40 or computing device may send a signal to open or close the switch either through a wired or wireless connection means. These connection means may include, but may not be limited to Wi-Fi, Ethernet cable, telephone cable, RFID, mobile communication networks, CDMA, GSM, Bluetooth, radio waves, infrared and coaxial cable.

Similar to the timer 38 described above, the remote switch 42 may also be accessed or integrated into a computer network. Accordingly, one or more computing devices with access to the network may be capable of manipulating the switch 42 remotely from their computing device. In some embodiments, a computer application or program may be loaded into the memory of the computing device that may provide access to one or more features of the remotely accessible switch 42. In some alternative embodiments, software loaded onto the computing device may provide a computing device access to each of the remotely accessible features of the pellet apparatus, including the timer 38 and the remote switch 42.

Figure 3:
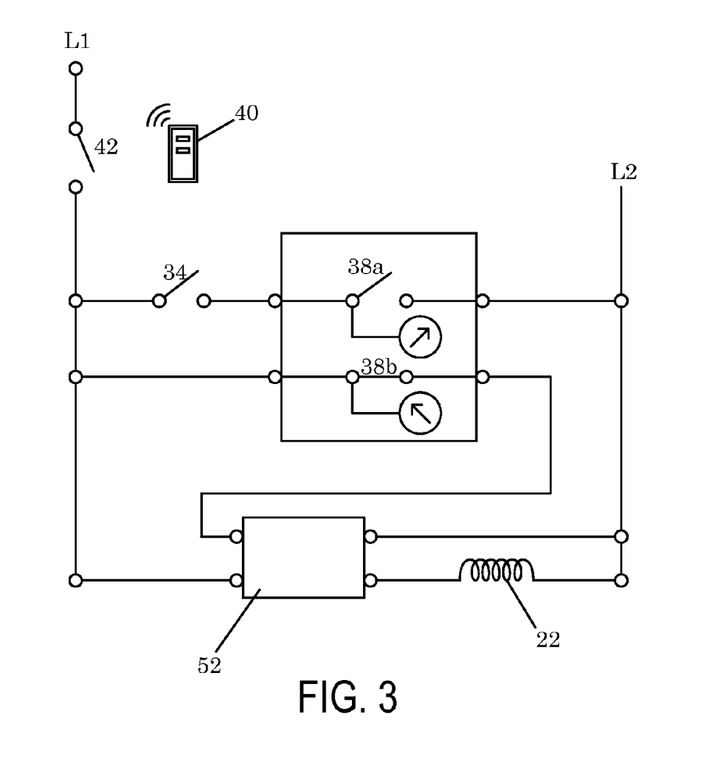
FIG. 3 depicts an electrical diagram of an embodiment of a wood pellet management apparatus.

In some embodiments of the apparatus 10, the timer and remote control activation may engage electrical switching within the circuit that engages the motor 22 of the apparatus 10. Referring to FIG. 3, the electrical diagram demonstrates numerous positions along the electrical circuit having main lines L1 and L2, where the circuit may be controlled by the user either remotely, manually or using a secondary device or mechanism. These secondary mechanisms may include on-timers 38a, off-timers 38b, remote switches 42 receiving information regarding the switch position from a remote 40 or computing device, a solid state relay 52 which may or may not receive a signal from one or more sensors, or a combination of one or more mechanisms thereof. Although the circuit only includes L1 and L2 lines, the circuit may be more complex, having an additional number of lines added to the circuit.

Embodiments of the wood pellet apparatus 10 may further include a pellet chamber 12. The pellet chamber 12 may act as the central receiving area within the pellet management apparatus 10 holding a plurality of wood pellets until they are dispensed or transferred from the apparatus. In some embodiments, a plurality of one or more pellets entering the pellet chamber 12 may be temporarily stored within the pellet chamber 12, until a subsequent point in time wherein the user desires to dispense the pellets being stored within the pellet chamber 12. In some embodiments, the pellet apparatus 10 may manually dispense the plurality of pellets being stored within the pellet chamber 12. In an alternative embodiment, the pellets held within the pellet chamber may be automatically dispensed.

Embodiments of the pellet chamber 12 may vary in size and storage capacity according to the use or needs of the user. In some embodiments, the storage capacity of the pellet chamber may be <0.3 gallons (0.0011 $m^3$), <0.5 gallons (0.018 $m^3$), <1 gallon (0.0038 $m^3$). In alternative embodiments the pellet chamber may be between 1 gallon (0.0038 $m^3$)-50 gallons (0.1893 $m^3$) of storage space, depending on the size of the pellet management apparatus 10 and pellet chamber 12 contained therein. In some embodiments designed for residential use, the pellet chamber may be at least approximately 1 gal., at least 2 gal. (0.0076 $m^3$), at least 2.5 gal. (0.0095 $m^3$), at least 5 gal. (0.0189 $m^3$), or at least 10 gallons (0.0379 $m^3$) of storage space or more. In some embodiments directed toward commercial uses, the storage and transfer capacity of the pellet chamber may be much larger. For example, in some embodiments, the size of the pellet chamber 12 may be between 50-1000 gallons (3.785 m$^3$) or larger.

Figure 2:
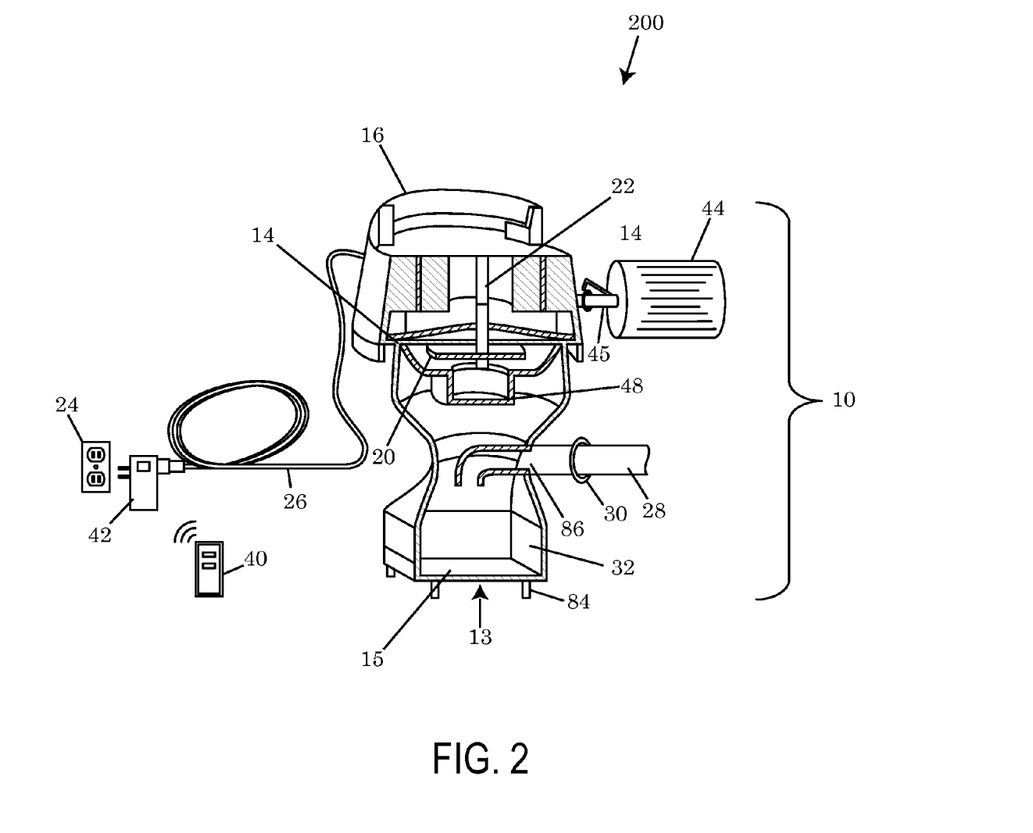
FIG. 2 depicts a cutaway sectional view of an embodiment of a wood pellet management apparatus.

Embodiments of the pellet chamber 12 may also be configured into various shapes. In the exemplary embodiment depicted in FIG. 2, the pellet chamber 12 may be rounded at the top with a tapered edge or neck that may feed the pellets to an outlet opening 13 at the bottom of the pellet chamber 12. In alternative embodiments, the top portion of the pellet chamber 12 may be rectangular, square, circular, rhomboid or any other shape that may adequately receive pellets into the pellet chamber 12. In some embodiments, the pellet chamber may have an hour glass shape, an oblong shape or even an irregular shape.

Embodiments of the outlet 13 at the bottom of the chamber 12 may also vary in shape and size. For example, the opening may be rounded, square, rectangular, triangular, trapezoidal, rhomboid or an irregular shape. As shown in the exemplary embodiment of FIG. 2, the opening is rectangular. However, the opening 13 may be any shape or size large enough to allow the dispensation of the pellets from the pellet chamber 12. The size and shape of the outlet opening 13 may vary in accordance with the desired shape of the pellet apparatus 10. The variation in shape may provide an opportunity give the pellet apparatus a sleek, unified or customized appearance.

In some embodiments, it may be desired by the user to seal the pellet chamber 12 to provide for greater suction and draw into the conduit 28 and inlet port 86 of the pellet apparatus 10. For this reason, the output opening 13 at the bottom portion of the pellet chamber 12 may further include a mechanism for sealing the chamber 12 in a controllable fashion. In some embodiments, the mechanism for sealing the chamber 12 may include a hinge having a pin or other fastener, a gasket and/or a control rod operated by a handle. In some of the embodiments having the described mechanism of sealing, the control rod may be lifted upward or downward to lift and lower the gasket, controlling the formation of an airtight seal at the output opening 13 at the bottom of the pellet chamber 12. When the rod is pulled upward using handle, the rod retainer may be placed into a notched slot. When the rod retainer engages the notched slot, the pellet container may form an airtight seal. Conversely, when the rod is lowered, the seal may disengage and bottom outlet 13 of the pellet chamber may be opened, allowing the dispensation of the pellets within the pellet chamber 12.

Figure 8:
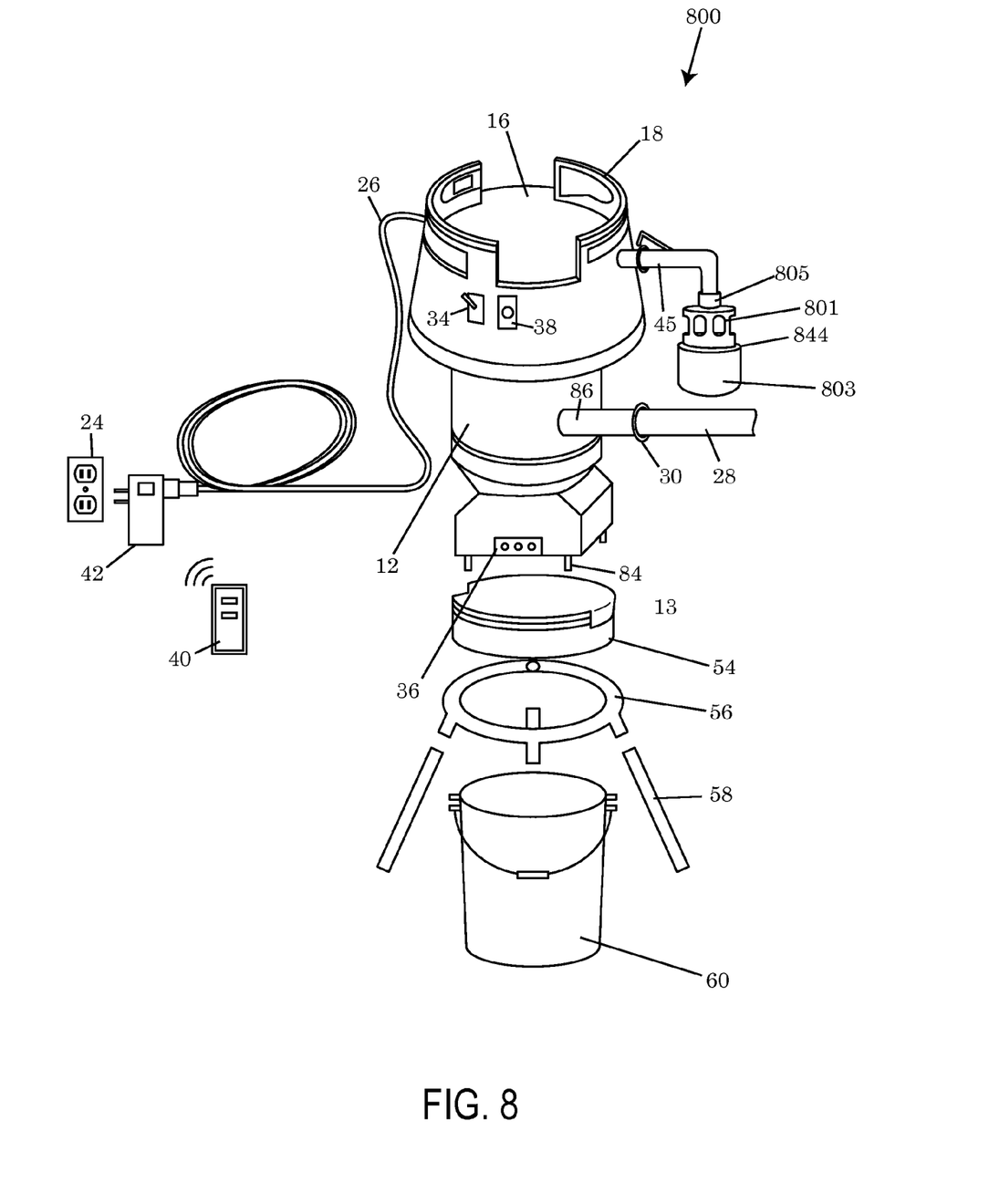
FIG. 8 depicts a perspective view of an alternate embodiment of a wood pellet management apparatus.
Figure 9:
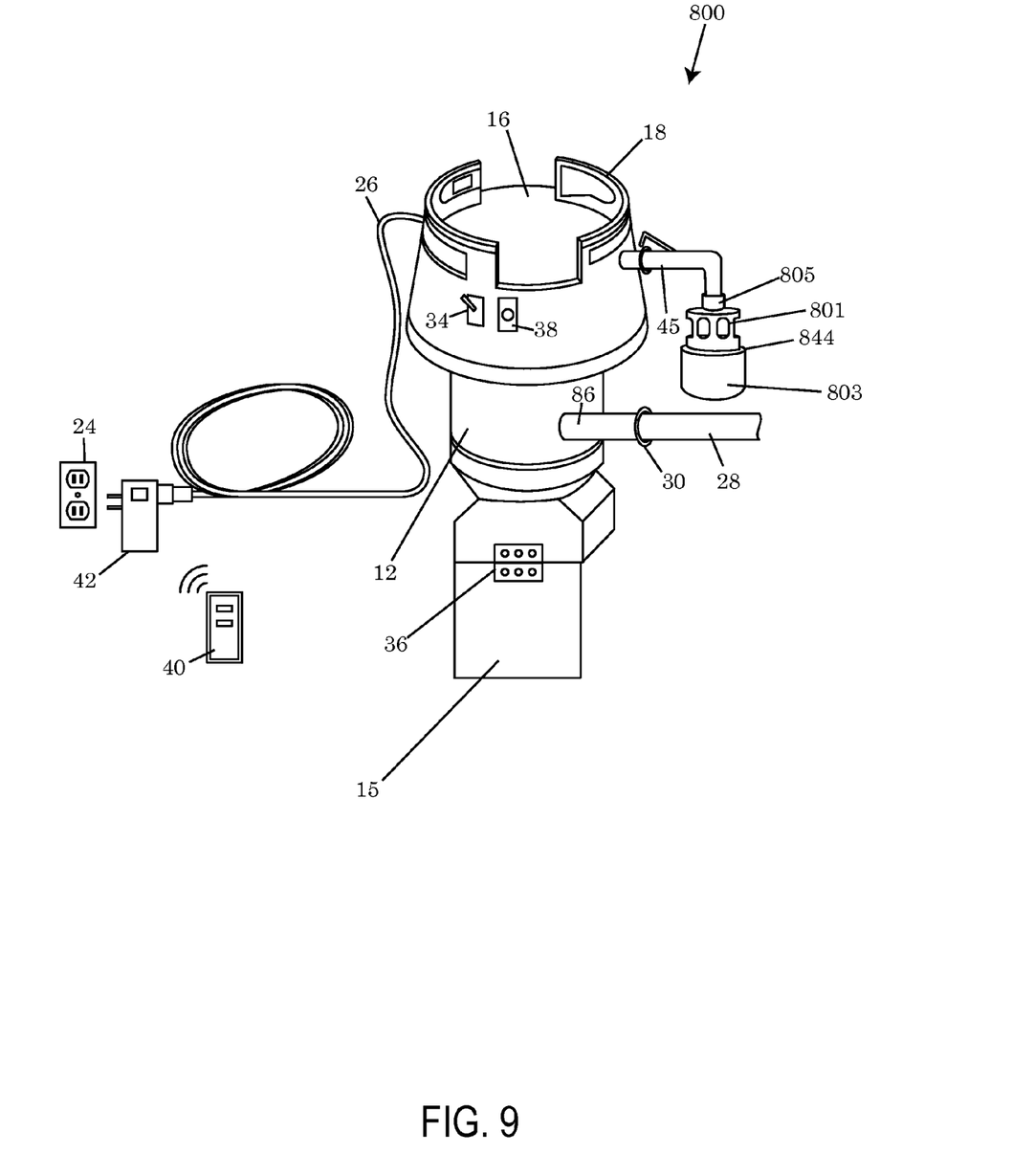
FIG. 9 depicts a perspective view of the embodiment of the wood pellet management apparatus of FIG. 8 in an open configuration.

In alternative embodiments, the apparatus 10 may be configured to fill and dispense itself automatically. In the automatic configuration, a self-closing hinge may 36 may be attached to a door 15 or cover as shown in the closed configuration in FIGS. 2 and 8 and in the open configuration in FIG. 9, which may prevent the contents of the pellet chamber 12 from dispensing out of the pellet chamber outlet 13. The self-closing hinge 36 may open and close the outlet 13 of the apparatus 10 by using the force of gravity as the wood pellets enter the pellet chamber 12. When the pellet chamber is empty or does not contain the requisite number of pellets or weight that is capable of opening the bottom of the pellet chamber, the bottom portion of the chamber 12 may be held in place and the outlet is closed. However, as the amount of pellets entering the pellet chamber increases, the weight within the chamber become closer and closer to the requisite weight needed for placing the self-closing hinge 36 in an open configuration. Subsequently, once the requisite weight is reached, the pellet chamber 12 door 15 may open and dispense the pellets through the pellet chamber outlet 13. As the pellets are dispensed, the weight of the pellets decreases, causing the self-closing hinge 36 to re-close itself and aggregate the next wave of incoming wood pellets within the pellet chamber 12.

Embodiments of the self-closing hinge 36 may be adjustable by the user or rated for a specific amount of weight before the hinge 36 enters the opened or closed state. Determining the appropriate self-closing hinge may depend on the size of the pellet chamber and the amount of pellets it may store, and the location where the pellets are being dispensed. For instance, when a pellet chamber has a large pellet chamber, a higher weight may be used for the self-closing hinge to activate or change conformations, allowing for a fuller pellet chamber to be dispensed. Likewise, a small pellet chamber 12 may have a lower weight rating for the self-closing hinge, because a full pellet chamber may not be able to amass as much weight within the pellet chamber 12 as an embodiment having a larger pellet chamber capable of using more weight to open the self-closing hinge 36. At the very least, a self-closing hinge may be selected which is able to open when the pellet chamber 12 is full of pellets to allow for dispensation. In some embodiments, the self-closing hinge 36 may be user adjustable, allowing the user to define the amount of weight amassed inside the pellet chamber 12, before the pellet chamber 12 door 15 opens and releases the pellets.

In one example of an automated embodiment of a pellet management apparatus, a switch 34 may become engaged completing the circuit to motor 22. A pressure plate having a self-closing hinge 36 may be raised up and the bottom of the a pellet chamber 12 may be sealed with flanges attached to a gasket. When the appropriate requisite amount of pellets, for example more than 1-100 pounds, more than 5 pounds, 10 pounds, 20 pounds, 30 pounds, 40 pounds, 50 pounds, etc. has entered the pellet chamber 12, as detected by the pressure plate, the plate may depress the switch and open the circuit, shutting off motor 22. In the exemplary embodiment, the requisite amount of wood pellets to place the self-closing hinge into the open configuration may be at least twenty (20) pounds. As the vacuum is turned off, the bottom of the pellet chamber 12 may be released, causing the pellets drop out of the chamber 12 via the outlet 13 and into the desired location. When the weight of the pellets relieves the pressure plate, the self-closing hinge 36 re-closes the bottom of the chamber 12 and re-latches itself. Once the pressure is released and the chamber is re-latched, the switch 34 may restore power back to the motor 22, turning the vacuum fan 20 back on and pellets may once again be drawn back into the pellet chamber 12, repeating the previously described action. This cycle of filling and releasing pellets may occur for as many cycles as desired by the user. This allows for as many pellets to be transferred as needed for the user to burn or store.

In an alternative embodiment, the wood pellet system 10 may further include a variable control mechanism. The variable motor control mechanism may allow for the user to turn on and off the wood pellet system 10, or adjust the speed at which the motor 20 operates, allowing for more or less suction as desired by the user. In the Exemplary embodiment, the variable control mechanism may be attached to an electrical cord 24 extending from the vacuum head 16 and into the control mechanism. The control mechanism may control the rate that the power source 24, feeding current via electrical cord into the control mechanism, exits the opposing side of the control mechanism's circuit and thus controlling the current entering the vacuum head 16 via electrical cord 26. In an another alternative embodiment, the variable control mechanism may be integrated into the vacuum head 16 allowing for onboard controls as opposed to the separate variable control mechanism. Embodiments having a control mechanism may further include other features to assist the user such as automatic timers 38 for starting and stopping the system 10.

Figure 4:
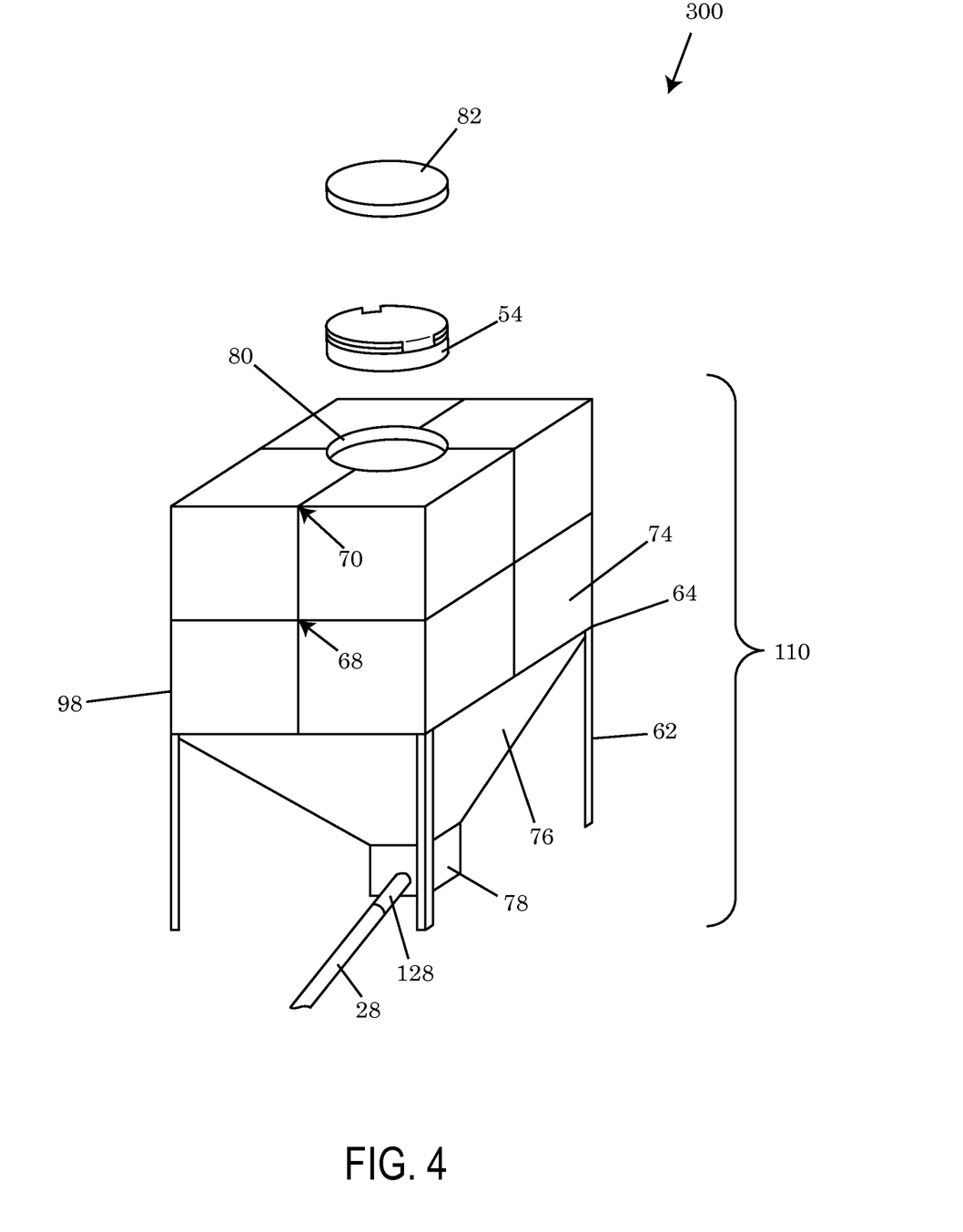
FIG. 4 depicts a front perspective view of an embodiment of a wood pellet storage container.

The pellet chamber 12 may further include in some embodiments, an inlet port 86 capable of receiving a plurality wood pellets from a source of wood pellets. In some embodiments, these wood pellets may be supplied to the inlet port 86 via a conduit 28. The conduit 28 may be configured to transport the plurality of wood pellets from a source of pellets to the inlet port 86 and into the pellet chamber 12. For example, in one embodiment, the first end of the conduit 28 may be in contact with the plurality of pellets, while the second end of the conduit may be disposed within the inlet port 86. When the motor 22 is initiated, a vacuum created by the vacuum fan 20 may create enough suction to draw the pellets from the pellet source into the conduit 28, transfer the plurality of pellets from the source of pellets and deposit the pellets inside the pellet chamber 12. The source of pellets being provided to conduit 28 may be supplied from various sources. For example, in some embodiments, the first end of conduit 28, receiving the source of pellets may be simply inserted within one or more bags of wood pellets or into one or more containers filled with a plurality of pellets. Alternatively, in other embodiments, the source of pellets may be provided from a storage container such as a bulk storage hopper 110 depicted in FIG. 4. In yet another alternative embodiment, the conduit 28 of the pellet apparatus 10 may be connected to a combination filling and dispensing station 500, depicted in FIG. 5, whereby the filling station 500 receives the conduit 28. Subsequently, as the vacuum fan 20 is initiated, the wood pellets provided to the filling station may be transferred along the conduit 28, into the pellet chamber 12.

The conduit 28, extending from the inlet port 86 to the source of pellets may be constructed from any material capable of providing a rigid structure having a hollow interior within the conduit to allow for a plurality of pellets to pass through the conduit 28. Embodiments of the conduit 28 may be constructed out of materials such as various metals, metal alloys, plastics, rubbers, or polymers. Examples of these materials may include but are not limited to aluminum, steel, galvanized steel, iron, brass, zinc, nickel, copper, titanium, concrete, cement, asbestos cement, polyvinyl chloride (PVC), chlorinated PVC (CPVC), polyethylene, high density polyethylene (HDPE), cross-linked polyethylene (PEX), vitrified clay and fiberglass. The conduit 28 may be in the form piping, tubing, or a semi-rigid hoses.

Initial testing has unexpectedly identified that more rigid material such as solid piping or smooth piping was able to transport the wood pellets from the source of wood pellets over a longer distance. While tubing and hoses may be capable of transporting wood pellets over shorter distances, the wood pellets may be more prone to obstruct and interlock within a tube or hose type conduit 28. During the construction of a plurality of prototypes of the exemplary embodiments, it was identified that soft, flexible tubing or hoses may work for distances less than 20 ft, less than 15 ft, or less than 10 ft efficiently with minimal obstruction. However, prototypes that were built with a conduit 28 having a more rigid construction such as a rigid pipe, the distances for transporting wood pellets from the source of wood pellets to the inlet port 86 of the pellet chamber 12 increased exponentially. In some embodiments, the rigid pipe conduit 28 was able to transport wood pellets a distance of more than at least 10 ft., more than 20 ft., more than 50 ft., more than 100 feet or more than 150 ft successfully to the pellet chamber 12 of the apparatus 10 without concerns of jamming or creating an obstruction within the conduit 28.

In addition to being constructed from a plethora of materials, embodiments of conduit 28 may also have various shapes and diameters. In some embodiments, the conduit 28 may be cylindrical in shape. In other embodiments, the conduit may have an irregular shape, square shape, rectangular shape, or a rounded rectangular shape. In some embodiments of the conduit 28, it was unexpectedly discovered that the square, rectangular or rounded rectangular shapes of the conduit may be able to increase the flow rate of the pellets through the conduit 28 and reduce any obstructions or blockages that may occur in cylindrically shaped conduits. This unexpected result may be explained by the cyclonic movement of solids and liquids that may occur as matter is transported through a cylindrical shaped conduit. While creating a cyclone within the conduit may be beneficial for increasing the movement of liquids, the cyclonic movement of solids, in particular the rectangular shaped wood pellets, may increase the probability of the pellets interlocking or butting up against one another while in the cylindrical conduit. Square, rectangular and even rounded-rectangular conduits may suction the pellets through the vacuum by the means of the conduit in a linear motion, instead of creating a cyclone. This direct path through the conduit, instead of the cyclonic path through the conduit 28, may allow for an increased flow of pellets through the conduit 28, even at diameters smaller than its cylindrical shaped counterparts.

Moreover, conduits 28 having square, rectangular, or a rounded-rectangular shaped interior passageways, may further enjoy the ability to transport larger volumes of wood pellets, over longer distances, and at faster rates than a comparable conduit having a cylindrical shape. In a head to head test between the identical embodiments, wherein one embodiment was constructed with a cylindrical conduit and the other constructed with a rectangular conduit, it was observed that the embodiment having the rectangular conduit was able to transport larger amounts of pellets, at a faster rate. Moreover the embodiment equipped with a rectangular conduit was capable of transferring pellets over a distance of more than 75 ft. Although the embodiment having the cylindrical conduit was able to transport wood pellets from a source of wood pellets to the pellet chamber 12, it did so at a rate less than the embodiment having the rectangular shaped conduit. Furthermore, the embodiment having the cylindrical conduit transferred the pellet efficiently over a shorter distance of less than 20 ft before obstructions became a more a more regular occurrence.

Embodiments of the conduit 28 may be fitted or secured to the inlet port 86 using an adaptor such as a fitting having a locking collar 30 or in some embodiments the conduit may be cut in a manner such that it nestles within the opening of the inlet port 86 or fastens thereto. In some embodiments, the end of the conduit 28 may also be fitted with a male hose adapter or pipe fitting that will mate with the inlet port 86 or a female adaptor securely fastened at the inlet port 86.

In one embodiment of the apparatus 10, wherein a male adaptor is present, the adaptor may include a locking tab to further secure or snap the pipe fittings together. In some embodiments the conduit 28 may be a single piece connected at one end to the inlet port 86 of the pellet chamber 12 and the opposing end of the conduit may be connected or directly mated with a container, hopper or another storage vessel having a port capable of mating and transferring the wood pellets. The connection between the each end of the conduit 28 may be mated pipe fittings, mated hose connectors, mated hose connectors or opposing ends with a female hose adapter having a locking collar 30 and/or a male locking tab. In an alternative embodiment, the length of the conduit 28 may be adjustable or telescoping. For example, a series or plurality of shorter pipes or hoses 26 may be mated at several interconnections between the inlet port 86 and the opposing end of the conduit.

Embodiments of the wood pellet apparatus 10 may further include a filtration system, which may be capable of preventing, removing or reducing the amount of sawdust and other particulate matter accompanying the wood pellets at the source of wood pellets from remaining inside the pellet chamber 12. In some embodiments, the filtration system may include a screen 48 capable of filtering the particulate matter and sawdust from the pellets and airstream created by the vacuum fan 20. As the apparatus 10 is turned on or initiated, the wood pellets along with any saw dust or fine particulate matter may enter the pellet chamber 12. The vacuum generated by the vacuum fan 20 may lift the lighter sawdust and particulate matter out of the pellet chamber 12 through the screen 48 and pass the sawdust or particulate matter to filter 40 via an exhaust outlet 45.

The screen 48 may be positioned between the pellet chamber 12 and the vacuum fan 20 in some embodiments. The positioning and location of the screen 48 may act as a barrier to prevent wood pellets from entering the interior of housing 14, while at the same time, allowing the saw dust and particulates to pass through and into a filter 44 attached to the housing 14. Embodiments of the screen 48 may be any size, shape or material that is strong enough to withstand the atmosphere of the vacuum within the housing 14 and pellet chamber 12. In the exemplary embodiment, the screen 48 may be 1/8" mesh screen 48 attached to the intake opening of the housing 14. In another embodiment, the screen 48 may have openings or pores that are less than 1/8" such as 1/16", 1/32", or greater than 1/8".

Embodiments of the filtration system may further include features that transport the sawdust and other fine particulates that are generated during the operation of the apparatus 10 or the transportation of wood pellets to a separate storage container. Embodiments of apparatus having a separate storage container may include a discharge point where the sawdust and particulates are deposited or stored. For example, in one embodiment of the filtration system, sawdust and other particulate matter that is filtered out through the screen 48, may be separated from the airstream and collected in the filter bag or other separate storage container. The air flowing through filtration system and into the filter bag may be returned to the ambient air through filter bag housing slots. The filter may be disposable in some embodiments, whereas in alternative embodiments, the filter bag may be reusable. The filter bag may be opened and closed, by the user for example via a zipper, snaps, fasteners or other known methods, for cleaning and maintenance purposes.

Embodiments of the filter 44 may vary according to the needs of the user. The filter may be cylindrical, rectangular or any other particular shape. In some embodiments, the filter 44 collecting the sawdust and fine matter particulates may be a dry pleated filter. In an alternative embodiment, the filter may be a wet application filter. In yet another embodiment 800, shown in FIG. 8 of the pellet management apparatus, another embodiment of a filter 844 may contain a wetted filter having ventilated filter housing 803. In the exemplary embodiment of the ventilated filter housing, the filter housing may contain one or more ventilation ports 801 around the circumferential side walls and/or surrounding an input port 805 receiving the exhaust air, sawdust and fine particulate matter from the exhaust port 45. The ported filter housing 803 may allow for the vacuum fan 20 exhaust to flow freely into and through the filter housing 803 and escape more quickly than a conventional pleated filter or wet application filter due to the presence of the ventilation ports 801.

Allowing for the vacuum fan exhaust to escape quickly may be advantageous in some situations because it may cause a reduction in exhaust pressure which may further reduce the likelihood of developing increased air flow resistance as the apparatus 10 operates. The development of airflow resistance may cause unnecessary strain on the filtration system and could reduce overall filtration efficiency of the apparatus 10. By allowing the exhaust from the vacuum fan 20 to dissipate into the ambient air once the exhaust enters the ventilated filter housing 803, the opportunity for the exhaust pressure to back up is reduced or eliminated.

In some embodiments of the filtration system, the ported filter housing 803 may further include a sponge or porous sponge-like material which may be placed within the ventilated filter housing 803. In such an embodiment, the gaseous exhaust of the vacuum fan may exit the filter housing 803 via the plurality of ports and vents 801 spaced along the filter housing 803, while the solid particulate matter, such as the sawdust is collected inside the filter housing 803. In particular, the sponge, or porous sponge-like material may be dampened or wet to adsorb the sawdust or other fine particulate matter to the surface of the filter. In some embodiments, the interior of the filter housing may include a cone-shaped or inclined surface extending from the bottom of the housing. Embodiments having this cone-shaped or inclined surface at the bottom may further place the sponge or porous sponge-like material as a ring encircling the perimeter of the base of the cone. Moreover, embodiments of the sponge or porous sponge-like material may be removed from the filter housing, cleaned, washed, replaced, recycled and/or reused.

In some embodiments of the apparatus 10, the apparatus 10 may further be attached to or partially enclosed within a storage container, such as a storage hopper 110 capable of storing bulk quantities of wood pellets. Embodiments of the container 110 may be outfitted with one or more support structures capable of seating and/or securing the pellet pump assembly on pins one or more pins 84 or connectors. In an alternative embodiment, the apparatus 10 may be configured with an adapter 54 that may interlock, connect or snap into a collar 80 positioned along the input of the container 110 the apparatus 10 is being attached to. In some alternative embodiments, the output port 13 of the apparatus 10 may be positioned such that the contents of the pellet chamber 12, when released, pass through the adapter 54 connected to the outlet port 13 and into the storage container 110.

Embodiments of the storage container 110 being filled by the apparatus 10, such as a storage hopper, may be constructed from a series of supports which form a support frame 98 and wall panels 74 to form a storage cabinet. In one embodiment, the storage hopper 110 may be constructed from a plurality of panels 74 attached to a frame 98. The frame may include a series of one or more fittings 64, 68 which may be specialized for attaching the panels to different positions of the frame 98. For example, the cross-fitting 68 may be used for attaching a plurality of side wall panels 74 together. Moreover, a lid fitting 70 may be used to attach a top panel of the hopper 110 to a side panel.

The container or hopper 110 may further include a built in funnel 76, wherein the bottom portion of the container or hopper 110 may have a series or none or more chamfered or sloped side walls. The funnel 76 may also include a box 78 at the base of the funnel 76. In such an embodiment including a box 78, the plurality of pellets may aggregate at the box for further distribution or dispensation via an outlet port 128. Moreover, in some embodiments, such as the exemplary embodiment depicted in FIG. 4, the container or hopper 110 may also include supporting legs 62 attached to the frame 98. In some embodiments, these legs 62 may be attached to the frame 98 using a fitting 64 capable of attaching the leg to the frame.

In some embodiments, the bulk storage hopper 110 may be constructed out of a series of plates attached to one another. The number of plates and the size of the plates may vary depending on the desired size and shape of the bulk storage hopper 110. In one embodiment, the bulk storage hopper 110 may include a lower box receiving the wood pellets in the hopper as they are gravity fed or suctioned from the bottom of the hopper 110 by the apparatus 10. The lower box may be constructed from a plurality of box plates.

The capacity of this bulk storage hopper 110 may vary depending on the dimensions of the hopper 110. For example, in one embodiment, the storage hopper 110 may hold approximately, at least 20 lbs, at least 40 lbs, at least 75 lbs, at least 100 lbs, at least 250 lbs, at least 500 lbs, at least at least 1200 lbs, or at least 2,250 lbs of wood pellets. In an alternative embodiment, the bulk storage hopper may be configured with more or less capacity by increasing or decreasing the size of the hopper 110.

In yet another alternative embodiment, the hopper 110 may be covered with a plurality of top plates. The plurality of top plates may include a notch when they are combined to allow for the inclusion of an optional lid 82. Each of the notched corners in the plurality of top plates may form the opening. In some embodiments, studs may be placed in each corner of the opening formed by the plurality of the notched plates. The lid 82 may be secured into place using any known means such as fasteners, screws, wingnuts, clips, a screw cap, or any other known means for securing a lid. In some alternative embodiments, a plurality of holes may be placed in lid 82 at one or more positions over the studs. Wing nuts may be used to fasten the lid in place and allow for easy removal by the user. In some alternative embodiments, the hopper 110 may further include a flange gasket that may be placed over the stud(s) 132 of the top plate(s) 130. This flange gasket 144 may form a seal when the flange of cover plate 136 is lowered into place. Wing nut(s) or other screws, clips or fasteners may be used to hold the bottom flange of pellet chamber 12 to maintain an airtight seal. A cap may be placed over the output hose or rigid pipe 112 to maintain an airtight seal. The cap may be outfitted with a locking tab capable of mating with a female locking collar 146 to form the seal. In the exemplary embodiment, the opening 80 of the hopper 110 may configured with a collar. The collar may allow for the lid 82 to fit over and snap together with the collar forming a seal.

Embodiments of the pellet apparatus 10 may further be connected, attached or secured to additional components as part of a pellet management system. Components of the pellet management system may include in some embodiments, one or more pellet apparatuses 10, a bulk storage container 110, such as a hopper or storage cabinet and a combination filling and dispensation station 500 connected via a conduit 28 to the inlet port 86 of the pellet apparatus 10 and either the outlet port 507 of the storage container 560 as shown in FIG. 6 or the outlet port 128 of the storage container 110 as shown in FIG. 7.

Figure 6:
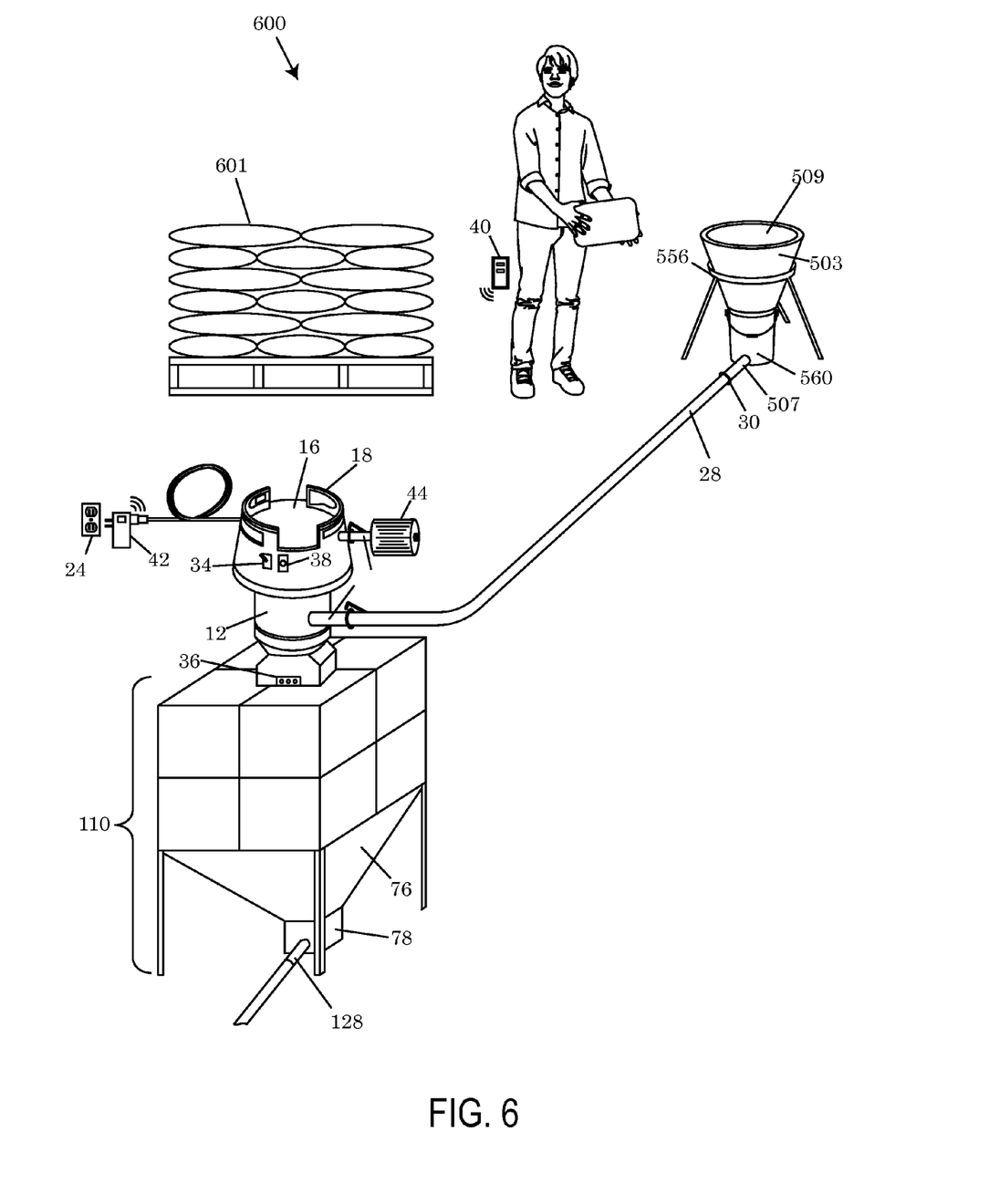
FIG. 6 depicts an embodiment of a wood pellet management system configured in a filling mode of operation.
Figure 7:
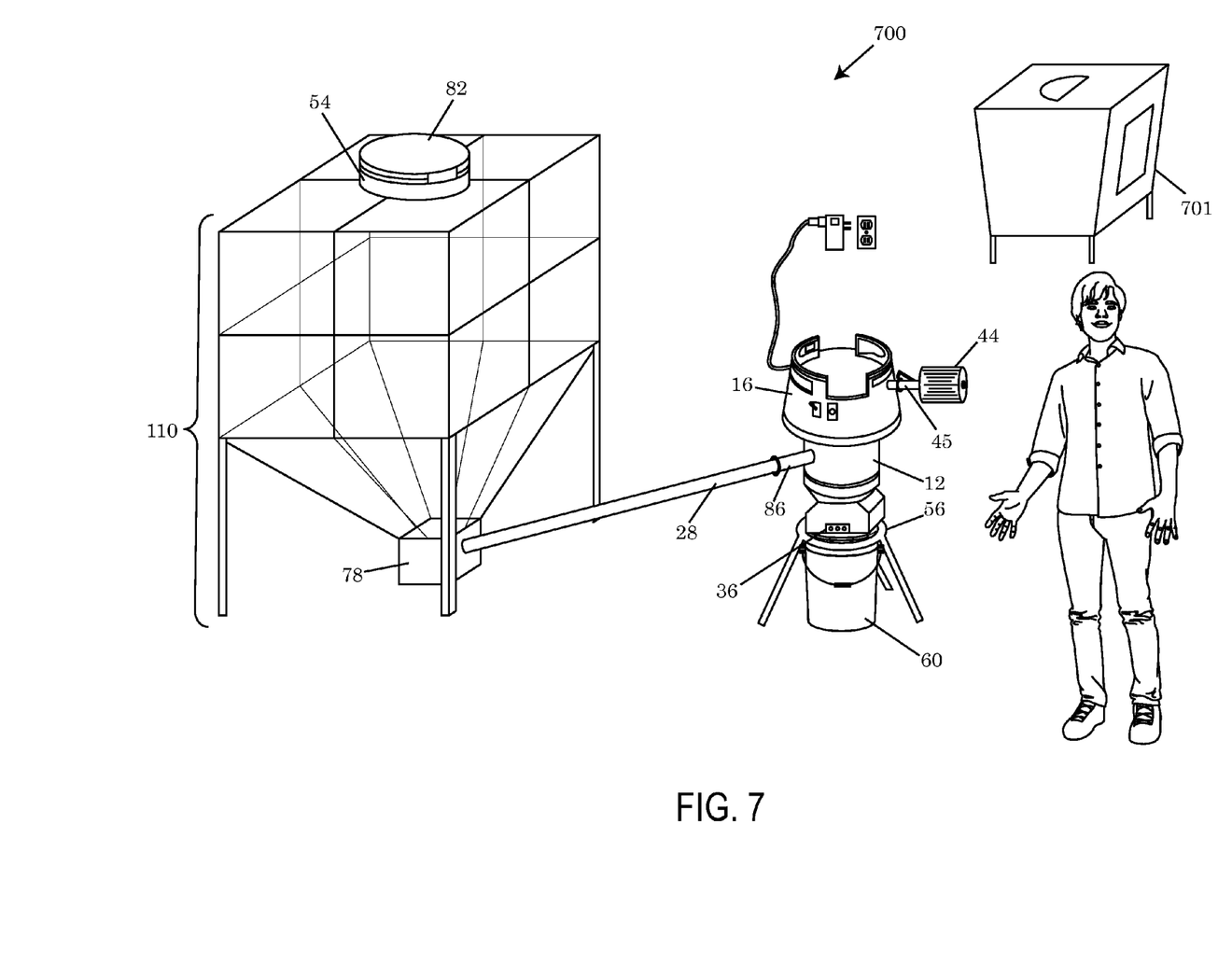
FIG. 7 depicts an embodiment of a wood pellet system configured in a dispensing mode of operation.

Embodiments of a pellet management system connected to a combination filling and dispensation station 500, as depicted in FIG. 6 and FIG. 7, may change roles in the transfer of wood pellets, depending on the mode of operation that the station 500 is selected to operate in. For example, in the embodiment 600 of the pellet management system, the station 500, may integrated and selected to operate in the pellet management system as a filling station. In this example, the station 500 may be considered to be configured in a filling mode, whereby the pellets may enter the filling station 500 via a funnel 503 and be transferred a first container 560 via the conduit 28 and into a second storage container 110 or even a pellet stove 701 directly.

Figure 5:
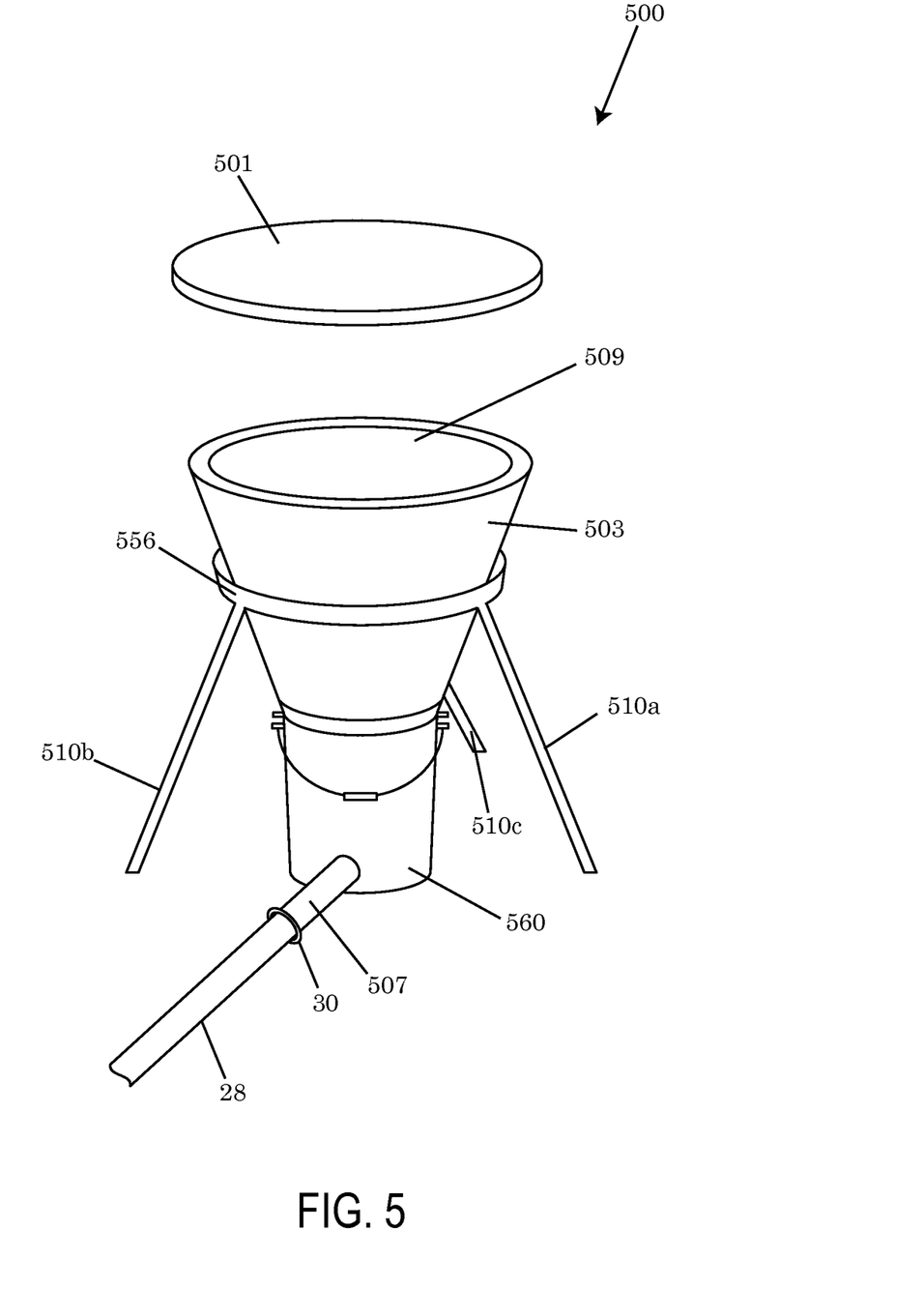
FIG. 5 depicts a front perspective view of an embodiment of a remote filling and dispensing station.

Embodiments of the station 500 configured to operate as a remote filling station, may include one or more containers 560, wherein said container 560 may have an inlet 509 able to receive a plurality of pellets from a source 601 of wood pellets. In some embodiments, the inlet may be a funnel 503 as shown in FIG. 5, directing the flow of pellets being provided from the inlet 509 to the storage container 560 below. In some embodiments, the station 500 may further include a support structure 556 capable of holding the funnel 503 in position as the pellets are being supplied to the station 500 and transferred. Embodiments of the support structure 556 may include a plurality of support legs 510a, 510b, 510c to provide stability. In some embodiments, the container 560 of the remote station 500 may include an outlet 507 which may be attached to the conduit 28 feeding into the inlet port 86 of the pellet apparatus 10.

As depicted in FIG. 6, the embodiment of the pellet management system 600 configured in a filling mode of operation may connect the outlet port of the filling station container to pellet apparatus 10 using conduit 28. In such an embodiment as the one depicted, the conduit may extend between the pellet apparatus 10 and the station 500 wherein the conduit 28 has its first end connected to the outlet port 507 of the filling station container 507 and the opposing end of the conduit 28 connected to the inlet port 86 of the pellet management apparatus 10.

When the pellet management system configured in filling mode 600 is electrically excited, the motor 22 of the apparatus 10 is becomes activated. Subsequently after activation, the wood pellets provided within the container 560 may be transported via the outlet port 507 from the container 560 to the inlet port 86 of the pellet chamber 12. As the pellet chamber receives additional amounts of pellets, the weight of the pellets within the chamber 12 increases. Ultimately, the plurality of pellets within the pellet chamber 12 may be dispensed manually by the user into the desired location, such as the bulk storage hopper 110 or stove 701 or the pellet may be dispensed automatically via the operation of a self-closing 36, as described above.

As shown in FIG. 6, the station 500 configured in fill mode may be loaded with a plurality of wood pellets. In some embodiments, this may be done manually by the user. While in alternative embodiments, the fill station may be equipped with a second pellet management apparatus 10, capable of filling container 560 from the source pellets 601. For example, the second pellet management apparatus may place a second conduit within the source of pellet 601 and transfer the pellet via a vacuum from the source of pellets 601 into the fill station container 560.

In other embodiments of the pellet management system, the system may be configured in a dispensation mode 700, similar to the embodiment depicted in FIG. 7. In dispensation mode 700, the pellet apparatus 10 may draw a plurality of wood pellets from a source such as one or more bags of wood pellets. In the Exemplary embodiment, the source of wood pellet may be from a bulk storage container such as a hopper 110. Embodiments of the apparatus 10 may be connected to the source of wood pellets by attached conduit 28. In the exemplary embodiment wherein the source of wood pellets is a bulk storage container 110, the conduit 28 may be connected to the outlet port of the bulk storage container 128. Moreover, in some embodiments, the pellet management apparatus may further be proximately positioned to dispense the wood pellets received from the pellet source into one or more storage containers 60 or in alternative embodiments, the pellet management apparatus may directly dispense the wood pellets into a pellet stove or furnace 701.

The pellet management apparatus 10 and the pellet management system 600, 700 may not be limited to only transferring, dispensing and supplying wood pellets to a pellet stove or furnace, the apparatus 10 and systems 600, 700 may also be used for other applications, including the transfer, supply or removal of wood pellets used as equine bedding. Including the removal of used equine bedding from horse stables, reducing the need for the individual to shovel the pellets. Instead, a user may place the first end of conduit 28 into a supply of fresh or used wood equine bedding pellets, and engage the motor 22. Similar to the embodiments discussed above, the vacuum fan 20 will form a vacuum, feeding the wood pellets from the fresh source of equine bedding wood pellets into the apparatus 10 where they may reside in the pellet chamber 12, until they are dispensed through the output 13 of the pellet chamber 12, into a container such as a trash receptacle.

In some embodiments, the system 700 may further include a support 56 capable of supporting the pellet management apparatus 10 and maintaining the position of the apparatus 10 while the apparatus 10 dispenses the plurality of pellets into the container 60 below. Embodiments of the support 56 may further include one or more support legs 58 attached to the support. Furthermore, in some embodiments, of the embodiment 700, the apparatus may connect to the support using an adapter 54 which may attach to the support 56, the outlet port 13 of the apparatus 10, the container 60 or a combination of structures thereof.

In some embodiments the system 700 may further comprise a funnel 503 residing within the container 60, connected to or positioned underneath the output opening 13 at the bottom of the pellet chamber 12. The funnel 503 may receive the wood pellets from the pellet apparatus 10 configured in a dispensing mode. In some embodiments, the funnel 82 may be locked into place using a support tab, snap together mechanism, screws, fasteners or other means for securing the funnel 503 in place. In the exemplary embodiment, the funnel 503 may remain in the open position and allow the received wood pellets to empty into a dispensing bucket 60 or container. The dispensing bucket 60, may be locked into place with tabs, snap fitting parts, or other means for securing the bucket to the support 56 to prevent the bucket from moving while dispensation of the wood pellets may be occurring. In the exemplary embodiment, the bucket or container 56 may be placed in an indentation of the support base 56 or an adapter 56 may attach to both the outlet 13 of the apparatus, pass through an opening of the support 56 and enter the inlet of the container 60, locking the adapter in place.

The bucket or container 60 may be any size or shape. For example, the container may range in size from <1 gallon, at least 1 gallon, at least 3 gallons, at least 5 gallons, at least 10 gallons or at least 20 gallons. In the exemplary embodiment, the dispensing bucket may have a 5 gallon capacity and may be capable of receiving up to 20 pounds of pellets. The size of the bucket or container may be adjusted depending on the output of the system and loading capacity of the pellet chamber. In some embodiments, the bucket or container 60 may be outfitted with one or more carrying handles to assist the user in transporting the contents of the bucket to the pellet stove.

In an alternative embodiment, the bottom of the pellet chamber 12 may be shaped in such a manner that the chamber 12 acts as a funnel 503, directing the contents of the pellet chamber directly into a bucket or container 60. In another alternative embodiment, the bucket or container 60 may attach directly to the output opening at the bottom portion of the pellet chamber 12 without the need for an adapter.

Embodiment of methods for managing a plurality of wood pellets further comprise the steps of providing a pellet management apparatus 10 such as one of the embodiments described above. Said pellet management apparatus being provided may include a housing 14 having a motor 22, a vacuum fan 20, a power supply 24 capable of controlling the output of the motor 22, a pellet chamber 12 connected to the housing 14 wherein the pellet chamber 12 may have an inlet 86 and an outlet 13, wherein said outlet 13 including a self-closing hinge 36 regulating the dispensation of the wood pellets. In some embodiments, the method for managing the plurality of wood pellet may further include initiating the motor 22 and the vacuum fan 20. In some embodiments of the method, the step of initiating may include remotely engaging the power supply. This may be completely in some embodiments using a receiver 42, a remote control 40 or even a remote computing device as described above.

In some embodiments of the method described above, the methods may further include the steps of displacing the plurality of wood pellets from a source of wood pellets such as the bags the pellets are packed in from the manufacturer or a bulk storage unit 110. The step of displacing may include forming a vacuum inside a conduit attached to the inlet 86 of the pellet chamber 12. As the vacuum is formed, the conduit may be drawing in wood pellets from the source of wood pellets, amassing the wood pellets inside the pellet chamber 12 of the apparatus 10. Furthermore, in some embodiments of the method described above, the step of amassing pellet within the chamber 12, may further include the step of reaching a requisite amount of wood pellets within the pellet chamber to disengage the self-closing hinge, followed by the step of disengaging the self-closing hinge 36. Once the self-closing hinge has been disengage, the pellet chamber 12 may proceed to continue dispensing the requisite amount of wood pellets from the pellet chamber 12. In some embodiments, the method for managing wood pellets may also include a step of re-engaging the self-closing hinge with the pellet chamber 12, thus closing the hinge and allowing pellets to continue amassing within the chamber 12 once again.

Additional steps of the embodiments of the method may further include the step of filtering the contents of the pellet chamber 12 by filtering the fine particulates in the pellet chamber from the smaller wood pellets, leaving behind the plurality of small wood pellets having a reduced saw dust and fine particular matter content. In some embodiments, the filtering step may not remove all of the particulates; however the amount of particulates remaining in the pellet chamber may be less than the amount of particulates that entered the chamber during the displacing step of the embodiments of the method. In some embodiments, the step of filtering may include the step of suctioning the fine particulate matter through the screen 48 and transferring or outputting the fine particulates to a filter 44, 544, a filter bag or container. In some embodiments of the method for distributing and filtering the wood pellets, the method may further comprise the step of dispensing the smaller pellets from the pellet chamber into a bucket, container, hopper, funnel and/or directly into the pellet stove or pellet furnace.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A pellet management apparatus comprising:
   a housing having a motor and a vacuum fan;
   a power supply, wherein the power supply controls an output of the motor;
   a pellet chamber connected to the housing, wherein the pellet chamber includes an inlet port connected to an inlet conduit and an outlet port regulated by a self-closing hinge connected to both a door and the pellet chamber, wherein the self-closing hinge is configured to open and close the door while under vacuum, in response to a gravitational force exerted by a plurality of wood pellets within the pellet chamber, on the door.

2. The apparatus of claim 1, wherein the apparatus further comprises a filtration system.

3. The apparatus of claim 2, wherein the filtration system comprises a screen positioned between the pellet chamber and the vacuum fan and a filter attached to the housing.

4. The apparatus of claim 1, wherein the inlet conduit is configured to transport the plurality of wood pellets from a source of wood pellets to the inlet port.

5. The apparatus of claim 4, wherein the inlet conduit has an opening that is square or rectangular in shape.

6. The apparatus of claim 1, further comprising a timer configured to regulate the power supply.

7. The apparatus of claim 1, wherein the power supply is remotely controlled.

8. A pellet management system comprising:
   a first container having an outlet;
   a pellet management apparatus including a housing having a motor and a vacuum fan, a power supply that controls an output of the motor, a pellet chamber connected to the housing, wherein the pellet chamber has an inlet, and an outlet regulated by a self-closing hinge connected to both a door and the pellet chamber, wherein the self-closing hinge is configured to open and close the door in response to a gravitational force exerted on the door by a plurality of wood pellets within the pellet chamber;
   a conduit connected to the outlet of the first container and the inlet of the pellet management apparatus; and
   a second container having an inlet, wherein said inlet of the second container is configured to receive the plurality of wood pellets from the outlet of the pellet management apparatus.

9. The system of claim 8, wherein the first container is a bulk storage hopper.

10. The system of claim 8, wherein the first container is a remote filling station and the second container is a bulk storage hopper.

11. The system of claim 8, wherein the pellet management apparatus further comprises a filtration system including a screen positioned between the pellet chamber and the vacuum fan and a filter attached to the housing.

12. The system of claim 8, wherein the conduit has an opening that is square or rectangular in shape.

13. The system of claim 8, wherein the pellet management apparatus further comprises a timer configured to regulate the power supply.

14. The system of claim 8, wherein the power supply is remotely controlled.

15. The apparatus of claim 3, wherein the filtration system comprises a ventilated filter housing comprising a plurality of ventilation ports, a sponge or porous sponge-like material and an inclined surface extending from a bottom of the ventilated filter housing.

16. The system of claim 11, wherein the filtration system further comprises a ventilated filter housing comprising a plurality of ventilation ports, a sponge or porous sponge-like material and an inclined surface extending from a bottom of the ventilated filter housing.

* * * * *